US012490917B2

(12) United States Patent
Rorie et al.

(10) Patent No.: US 12,490,917 B2
(45) Date of Patent: Dec. 9, 2025

(54) STATIC GONIOMETER GAGE AND SET

(71) Applicant: The United States Government as represented by the Department of Veterans Affairs, Washington, DC (US)

(72) Inventors: Dana Rae Rorie, Charleston, SC (US); Shawn Ethan Katalinas, Johns Island, SC (US); Bethany Baldwin, Charleston, SC (US)

(73) Assignee: THE UNITED STATES GOVERNMENT AS REPRESENTED BY THE DEPARTMENT OF VETERANS AFFAIRS, Washington, DC (US)

( * ) Notice: Subject to any disclaimer, the term of this patent is extended or adjusted under 35 U.S.C. 154(b) by 306 days.

(21) Appl. No.: 18/125,995

(22) Filed: Mar. 24, 2023

(65) Prior Publication Data

US 2024/0315602 A1 Sep. 26, 2024

(51) Int. Cl.
*A61B 5/11* (2006.01)
*A61B 5/107* (2006.01)

(52) U.S. Cl.
CPC .......... *A61B 5/1121* (2013.01); *A61B 5/1071* (2013.01)

(58) Field of Classification Search
CPC ... A61B 5/1121; A61B 5/1071; A61B 5/4585; A61B 5/4528
See application file for complete search history.

(56) References Cited

U.S. PATENT DOCUMENTS 4,945,649 A * 8/1990 Parker ...................... G01B 3/56
33/534
2004/0107592 A1* 6/2004 Matlis .................... A61B 5/225
33/512

\* cited by examiner

*Primary Examiner* — Xin Y Zhong
(74) *Attorney, Agent, or Firm* — Ballard Spahr LLP

(57) ABSTRACT

Static goniometer gages having no moving parts are provided in a set of static goniometer gages to permit measurements of angles over a range of angles. Static goniometers in the set having lobes subtending different angles are used to measure joint range of motion in flexion, extension, abduction and adduction and track changes in joint range of motion in response to occupational therapy.

16 Claims, 7 Drawing Sheets

STATIC GONIOMETER GAGE AND SET

FIELD OF THE INVENTION

This invention concerns goniometers for measuring joint extension, flexion, abduction and adduction, and goniometer sets to measure changes in joint range of motion.

BACKGROUND

Goniometers are effective at measuring range of motion of joints as well as tracking changes in joint range of motion to determine a patient's progress through occupational therapy. Traditionally, a therapist takes range of motion measurements in a clinical setting using a goniometer having pivoting arms centered on a graduated scale which measures the angle subtended by the arms. When aligned with the appendages connected at a joint, the subtended angle provides a measure of the range of motion of the joint.

Traditional goniometers may be difficult for patients to use by themselves, especially if the patients lack the fine motor skills necessary to achieve an accurate placement and reading of the goniometer. Measurements of the small joints of the fingers and thumb are particularly challenging, as it requires the patient to manipulate the goniometer with one hand. These disadvantages of the traditional goniometer have substantially confined range of motion measurements to the clinical setting, precluding, for example, home use of a goniometer to permit patients to measure and track their progress. There is clearly an opportunity to improve goniometers and adapt them for use directly by patients and thus provide additional options for non-clinical use in response to the emerging telehealth environment.

SUMMARY

The invention concerns a static goniometer gage adapted to measure flexion and extension of a joint. In an example embodiment the static goniometer gage comprises a first elongate lobe and a second elongate lobe fixedly attached to the first elongate lobe at a vertex. The first and second elongate lobes subtend an angle measured between the first and second elongate lobes. In a specific example embodiment the first elongate lobe may be shorter than the second elongate lobe. Further by way of example, the subtended angle may range from 180° to 80°.

In an example embodiment, a static goniometer gage according to the invention may further comprise a third lobe extending from one of the first and second lobes. The third lobe defines a surface and may be positioned proximate to the vertex. Indicia may be positioned on the surface. By way of example the indicia may describe a measure of a supplementary angle to the angle subtended by the first and second lobes. In a further example embodiment the first, second and third lobes may be co-planar.

The invention also encompasses a static goniometer gage set for determining changes in range of motion of a joint in flexion and extension. In an example embodiment the static goniometer gage set comprises an initial static goniometer gage, a final static goniometer gage, and a plurality of intermediate static goniometer gages. In an example embodiment each static goniometer gage comprises a first elongate lobe and a second elongate lobe fixedly attached to the first elongate lobe at a vertex. The first and second elongate lobes of the initial static goniometer gage subtend an initial angle measured between the first and second lobes of the initial static goniometer gage and the first and second elongate lobes of the final static goniometer gage subtend a final angle measured between the first and second lobes of the final static goniometer gage. Further, the first and second elongate lobes of each one of the intermediate static goniometer gages subtends a respective angle, measured between respective first and second lobes of each the intermediate static goniometer gage. In an example set of static goniometer gages according to the invention no two of the angles subtended by the first and second lobes of any of the static goniometer gages comprising the static goniometer gage set are equal to one another.

In an example set, the first elongate lobe may be shorter than the second elongate lobe; the initial angle subtended by the first and second lobes of the initial static goniometer gage may equal 180° and the final angle subtended by the first and second lobes of the final static goniometer gage may equal 80°. By way of further example, the final angle subtended by the first and second lobes of the final static goniometer gage may equal 100°.

An example static goniometer gage set according to the invention may comprise a first though a nineteenth of the intermediate static goniometer gages. The respective angles subtended by the first and second lobes of each of the intermediate static goniometer gages may increase in magnitude from the first through the nineteenth intermediate static goniometer gages by increments of 5°. In another example embodiment, a set may further comprise a first through a fifteenth of the intermediate static goniometer gages. The respective angles subtended by the first and second lobes of each of the intermediate static goniometer gages in this example set may increase in magnitude from the first through the fifteenth intermediate static goniometer gages by increments of 5°.

An example embodiment of a set of static goniometer gages may comprise a first though a nineteenth of the intermediate static goniometer gages wherein the respective angles subtended by the first and second lobes of each of the first through the nineteenth intermediate static goniometer gages have respective magnitudes of 175°, 170°, 165°, 160°, 155°, 150°, 145°, 140°, 135°, 130°, 125°, 120°, 115°, 110°, 105°, 100°, 95°, 90 and 85°. In another example static goniometer gage set according to the invention may comprise a first though a fifteenth of the intermediate static goniometer gages wherein the respective angles subtended by the first and second lobes of each of the first through the fifteenth intermediate static goniometer gages have respective magnitudes of 175°, 170°, 165°, 160°, 155°, 150°, 145°, 140°, 135°, 130°, 125°, 120°, 115°, 110°, and 105°.

In an example static goniometer gage set according to the invention, the initial angle, the final angle, and the respective angles may range from 180° to 85°. By way of further example, the initial angle, the final angle, and the respective angles may range from 180° to 100°.

DETAILED DESCRIPTION

Figure 1:
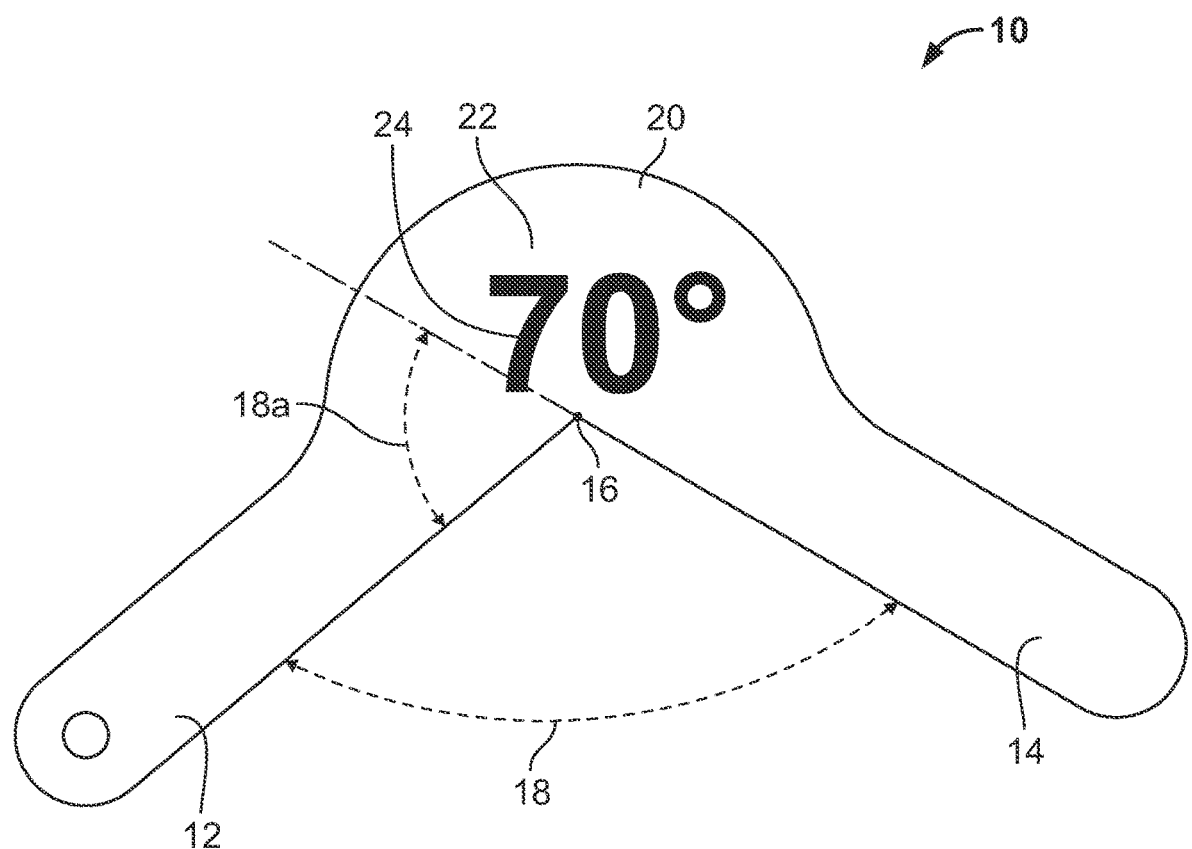
FIG. 1 shows a plan view of an example static goniometer gage according to the invention.

FIG. 1 shows an example static goniometer gage 10 according to the invention. Hereafter the term "gage" will be used to mean "static goniometer gage". Gage 10 is adapted to measure flexion, extension, abduction and adduction of a joint, for example, the various joints of the fingers and thumb. The gage 10 may also be scaled as necessary for measurements of larger joints such as the wrist joint, elbow joint, knee joint, ankle joint and the like.

Figure 1A:
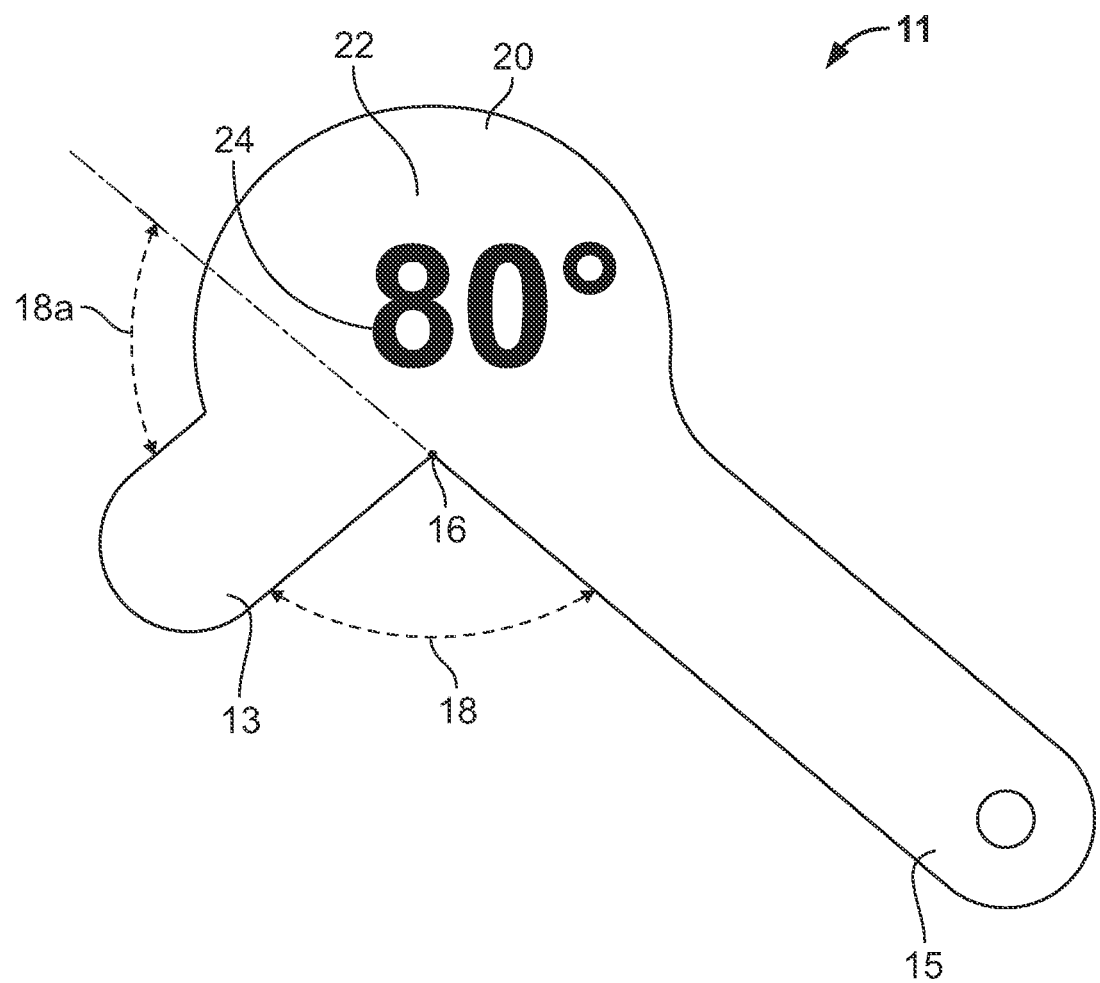
FIG. 1A shows a plan view of another example static goniometer gage according to the invention.
Figure 2:
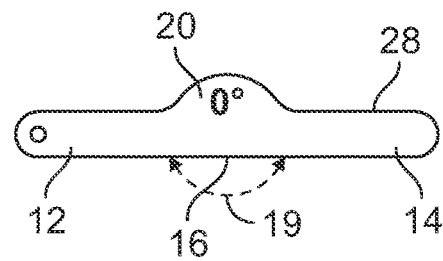
FIGS. 2-22 show, in plan view, an example set of static goniometer gages covering a joint angle range from 0° to 100°.
Figure 7:
Figure 3:
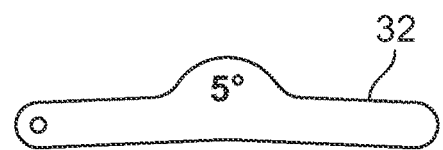
Figure 8:
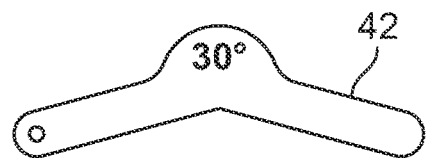
Figure 4:
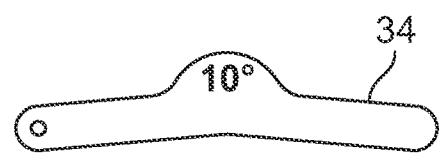
Figure 9:
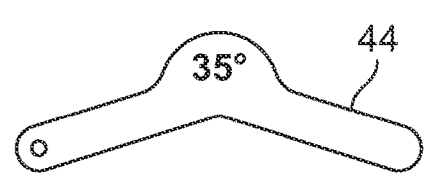
Figure 5:
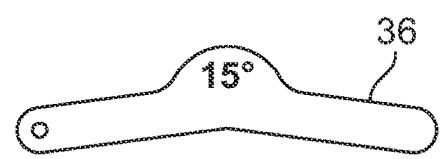
Figure 10:
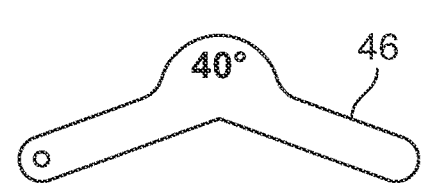
Figure 6:
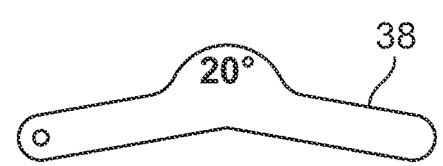
Figure 11:
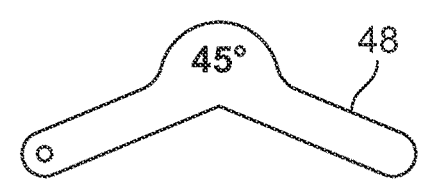
Figure 12:
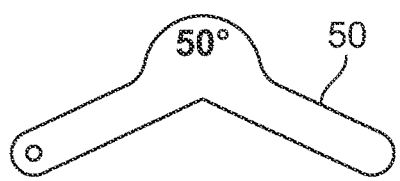
Figure 18:
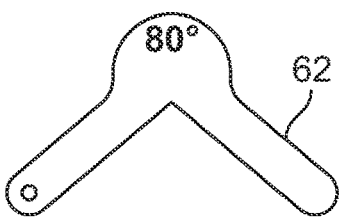
Figure 13:
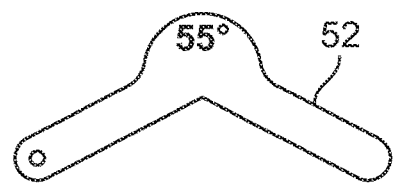
Figure 19:
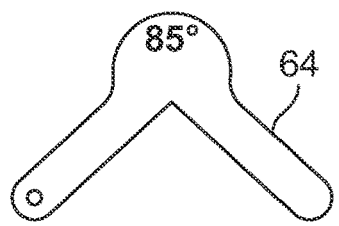
Figure 14:
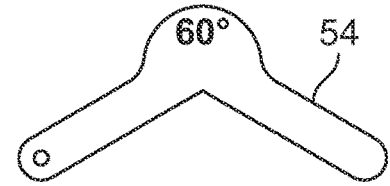
Figure 20:
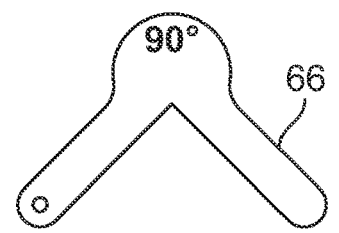
Figure 15:
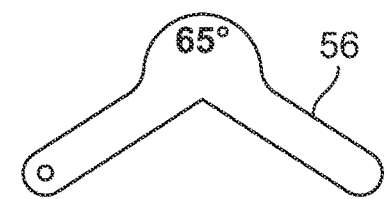
Figure 21:
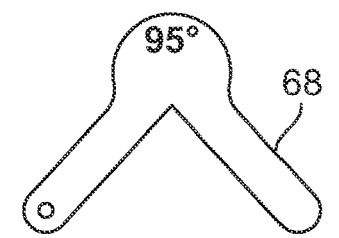
Figure 16:
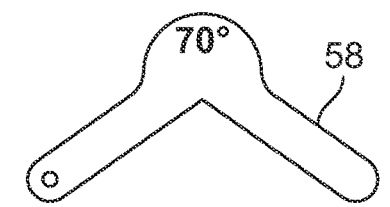
Figure 17:
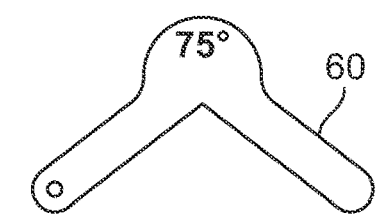
Figure 22:
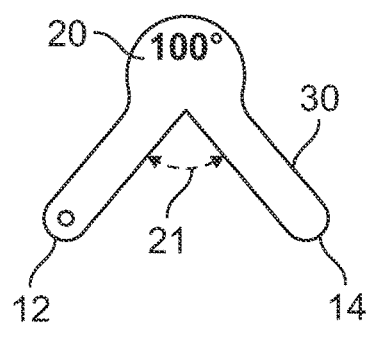

In this example embodiment the gage 10 comprises a first elongate lobe 12. A second elongate lobe 14 is fixedly attached to the first elongate lobe 12 at a vertex 16. FIG. 1A shows another example embodiment of a gage 11 according to the invention wherein the first elongate lobe 13 is shorter than the second elongate lobe 15. In both gage embodiments 10 and 11, the first and second elongate lobes 12, 14 and 13, 15 respectively subtend an angle 18 measured between the first and second lobes. In the example gage 10 shown in FIG. 1 the subtended angle 18 is 110°. The subtended angle 18 and the joint angle 18a, which is the angle through which the joint being measured moves, are supplementary angles, meaning their sum equals 180°. The example gage 10 would thus measure a joint range of motion of 70°. It is understood that gages subtending any angle are feasible. FIGS. 2-22 show example gages according to the invention wherein the joint angle 18a (see FIG. 1) measures a joint motion ranging from 0° to 100° corresponding respectively to subtended angles of 180° and 80°. FIGS. 25-41 show example gages according to the invention for measuring the joint angle 18a (see FIG. 1A) from 0° to 80°, corresponding to respective subtended angles 18 ranging from 180° to 100°.

FIGS. 1 and 1A also show gages 10 and 11 comprising a third lobe 20 extending from one of the first and second lobes 12 and 14 and 13 and 15. In these examples the third lobe 20 extends from both the first and second lobes and is positioned proximate to the vertex 16. The third lobe 20 defines a surface 22. Surface 22 provides for a convenient display of indicia 24 which are positioned on the surface 22. In this example the indicia 24 describe a measure of the joint angle 18a, not the angle 18 subtended by the first and second lobes 12 and 14 or 13 and 15. Further by way of example, the first, second and third lobes of either gage 10 or 11 may be co-planar. Gages 10 and 11 may be advantageously formed from plastic resin to provide a tough, flexible item which is easy to clean and suitable for injection molding for mass production as well as additive production methods for limited production runs favoring custom developed angular ranges and increments.

The invention also encompasses a static goniometer gage set 26, depicted in FIGS. 2-22. Here after the term "gage set" will be used to mean "static goniometer gage set". The gage set 26 is adapted for determining and tracking changes in range of motion of joints in flexion, extension, abduction and adduction. In this example, the gages of the set 26 are sized to accommodate the various joints of the fingers and thumb. The example gage set 26 shown in FIGS. 2-22 comprises an initial gage 28, a final gage 30, and a plurality of intermediate gages 32-68.

Gages 28-68 comprising gage set 26 are as described above for example gage 10 and thus comprise elongate lobes 12, 14, a vertex 16 and may also comprise a third lobe 20. However, the first and second elongate lobes 12 and 14 of the initial gage 28 subtend an initial angle 19 which in this example represents the low end of the range of joint angles 18a contained within the gage set 26. In the example gage set 26 that initial angle 19 is 180°, corresponding to a joint angle 18a of 0°. The first and second elongate lobes 12, 14 of the final gage 30 subtend a final angle 21 which in the example gage set 26 represents the high end of the range of joint angles 18a contained within the set. In the example gage set 26 that final angle 21 is 80° which corresponds to a joint angle 18a of 100°. Gage sets according to the invention may of course encompass other angular ranges.

The first and second elongate lobes 12 and 14 of each one of the intermediate gages 32-68 subtend a respective angle, measured between respective first and second lobes of each intermediate gage, wherein no two of the angles subtended by the first and second lobes of any of the gages comprising the gage set 26 are equal to one another. As shown in FIGS. 2-22, example gage set 26 comprises nineteen intermediate gages 32-68. The respective angles 18 subtended by the first and second lobes 12, 14 of each of the intermediate gages 32-68 increases in magnitude from the first intermediate gage 32 through the nineteenth intermediate gage 68 by increments of 5°. Gage sets according to the invention having other angular increments are also feasible.

Gage set 26 depicted in FIGS. 2-22 thus comprises the following set elements:

| Gage | Angle Subtended | Joint Angle | Remarks | FIG. |
|---|---|---|---|---|
| 28 | 180° | 0° | Initial Gage | 2 |
| 30 | 80° | 100° | Final Gage | 22 |
| 32 | 175° | 5° | Intermediate Gage | 3 |
| 34 | 170° | 10° | Intermediate Gage | 4 |
| 36 | 165° | 15° | Intermediate Gage | 5 |
| 38 | 160° | 20° | Intermediate Gage | 6 |
| 40 | 155° | 25° | Intermediate Gage | 7 |
| 42 | 150° | 30° | Intermediate Gage | 8 |
| 44 | 145° | 35° | Intermediate Gage | 9 |
| 46 | 140° | 40° | Intermediate Gage | 10 |
| 48 | 135° | 45° | Intermediate Gage | 11 |
| 50 | 130° | 50° | Intermediate Gage | 12 |
| 52 | 125° | 55° | Intermediate Gage | 13 |
| 54 | 120° | 60° | Intermediate Gage | 14 |
| 56 | 115° | 65° | Intermediate Gage | 15 |
| 58 | 110° | 70° | Intermediate Gage | 16 |
| 60 | 105° | 75° | Intermediate Gage | 17 |
| 62 | 100° | 80° | Intermediate Gage | 18 |
| 64 | 95° | 85° | Intermediate Gage | 19 |
| 66 | 90° | 90° | Intermediate Gage | 20 |
| 68 | 85° | 95° | Intermediate Gage | 21 |

Figure 23:
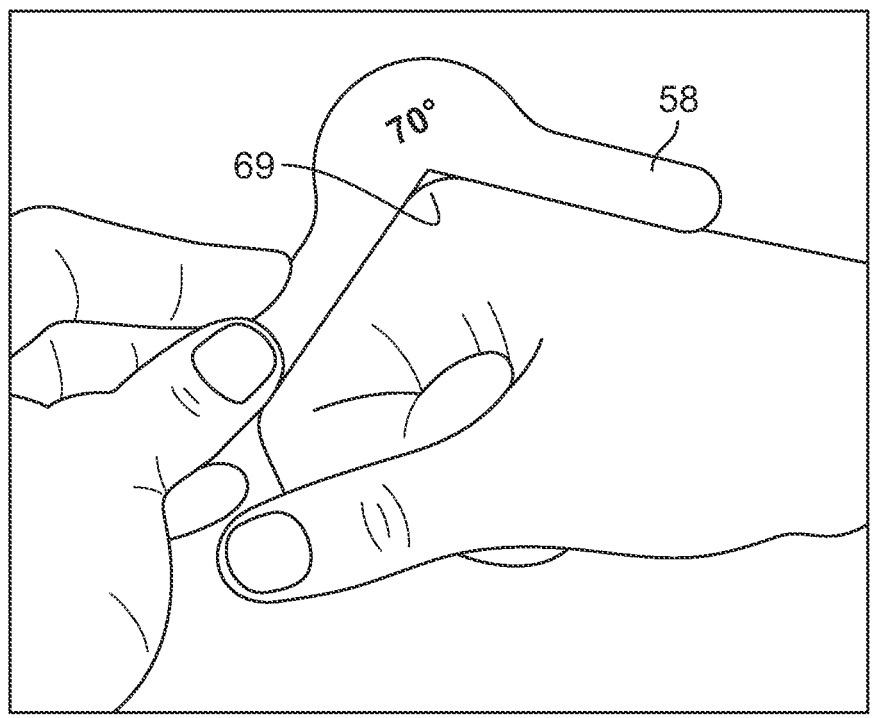
FIGS. 23 and 24 show an example static goniometer gage in use.
Figure 24:
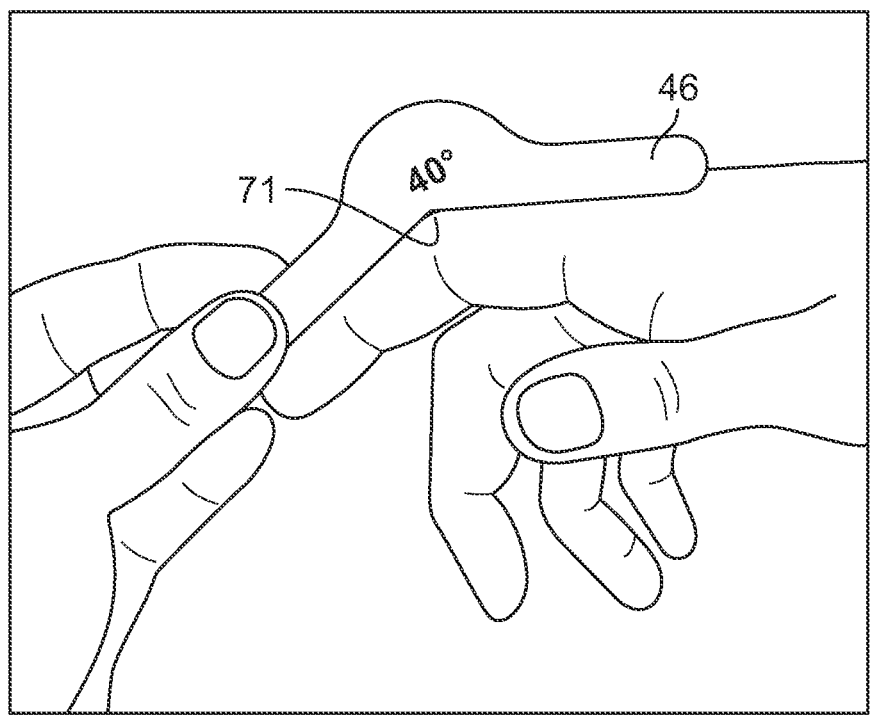
Figure 25:
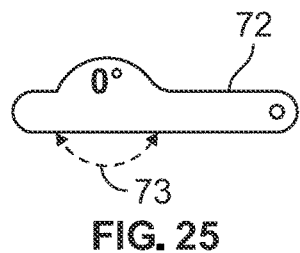
FIGS. 25-41 show, in plan view, another example set of static goniometer gages covering a joint angle range from 0° to 80°.
Figure 31:
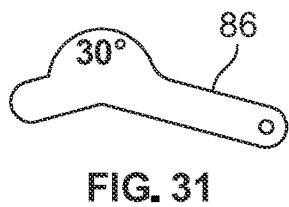
Figure 37:
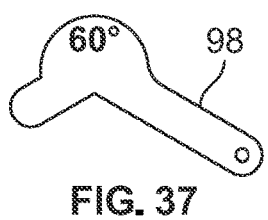
Figure 26:
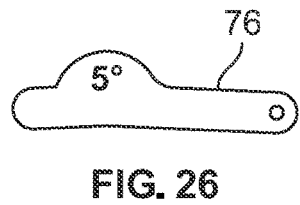
Figure 32:
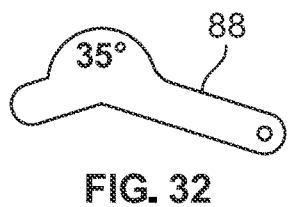
Figure 38:
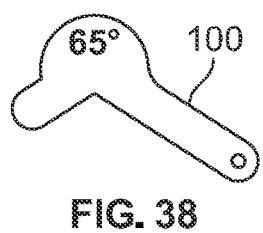
Figure 27:
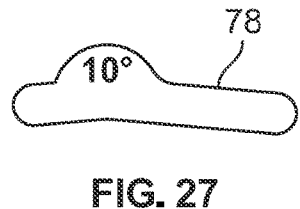
Figure 33:
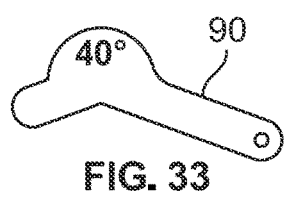
Figure 39:
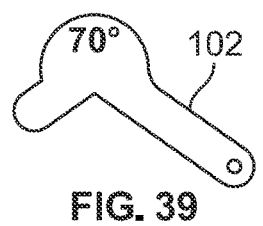
Figure 28:
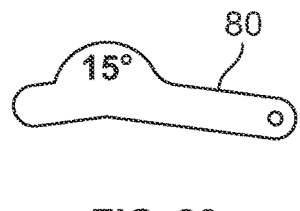
Figure 34:
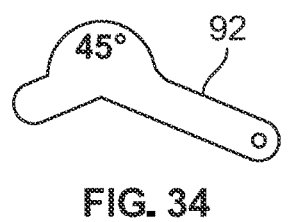
Figure 40:
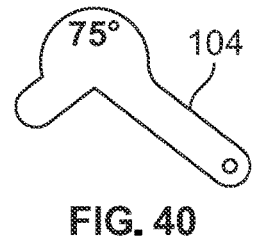
Figure 29:
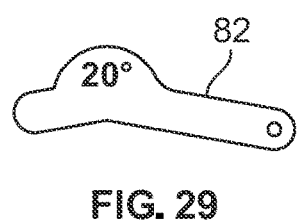
Figure 35:
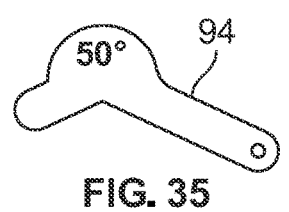
Figure 41:
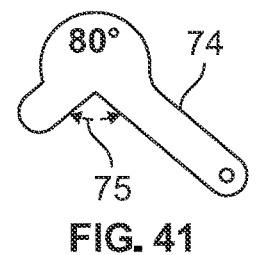
Figure 30:
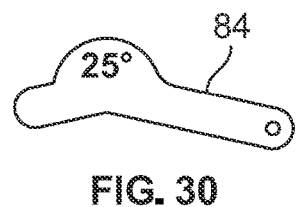
Figure 36:
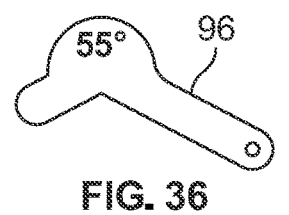

FIG. 23 shows an example gage 58 from gage set 26 in use to measure the angular flexion of a metacarpophalangeal joint 69. Joint 69 is placed into flexion and gage 58 from the set is applied to the joint to determine the angle through which the joint moves (the joint angle 18a as defined in FIG. 1) and thereby establish a measurement of the flexion range of motion at that instant. This angular measure may be recorded, and a subsequent measurement, for example, conducted after further occupational therapy, may use the same gage 58, showing little or no increase in range of motion, or a difference gage subtending a different angle, which would indicate a change in the range of motion. FIG. 24 shows gage 46 in use to measure flexion of a proximal interphalangeal joint 71.

FIGS. 25-41 show another example static goniometer gage set 27. The gage set 27 is adapted for determining and tracking changes in range of motion of distal interphalangeal joints as described below. In this example, the gages of the set 27 comprise gages similar to gage 11 as shown in FIG. 1A and are sized to accommodate the distal interphalangeal joints. The example gage set 27 shown in FIGS. 25-41 comprises an initial gage 72, a final gage 74, and a plurality of intermediate gages 76-104.

Gages 72-104 comprising gage set 27 are as described above for example gage 11 and thus comprise elongate lobes 13 and 15 (13 being shorter than 15), a vertex 16 and may also comprise a third lobe 20. However, the first and second elongate lobes 13 and 15 of the initial gage 72 subtend an initial angle 73 which in this example represents the low end of the range of joint angles 18*a* contained within the gage set 27. In the example gage set 27 that initial joint angle 73 is 0° corresponding to a subtended angle of 180°. The first and second elongate lobes 13, 15 of the final gage 74 subtend a final joint angle 75 which in the example gage set 27 represents the high end of the range of angles 18 contained within the set. In the example gage set 27 that final joint angle 75 is 80° and corresponds to a subtended angle of 100°. Gage sets according to the invention may of course encompass other angular ranges.

The first and second elongate lobes 13 and 15 of each one of the intermediate gages 76-104 subtend a respective angle, measured between respective first and second lobes of each intermediate gage, wherein no two of the angles subtended by the first and second lobes of any of the gages comprising the gage set 27 are equal to one another. As shown in FIGS. 25-41, example gage set 27 comprises 15 intermediate gages 76-104. The respective angles 18 subtended by the first and second lobes 13 and 15 of each of the intermediate gages 76-104 increases in magnitude from the first intermediate gage 76 through the fifteenth intermediate gage 104 by increments of 5°. Gage sets according to the invention having other angular increments are also feasible.

Gage set 27 depicted in FIGS. 24-40 thus comprises the following set elements:

| Gage | Angle Subtended | Joint Angle | Remarks | FIG. |
|---|---|---|---|---|
| 72 | 180° | 0° | Initial Gage | 24 |
| 74 | 80° | 100° | Final Gage | 40 |
| 76 | 175° | 5° | Intermediate Gage | 25 |
| 78 | 170° | 10° | Intermediate Gage | 26 |
| 80 | 165° | 15° | Intermediate Gage | 27 |
| 82 | 160° | 20° | Intermediate Gage | 28 |
| 84 | 155° | 25° | Intermediate Gage | 29 |
| 86 | 150° | 30° | Intermediate Gage | 30 |
| 88 | 145° | 35° | Intermediate Gage | 31 |
| 90 | 140° | 40° | Intermediate Gage | 32 |
| 92 | 135° | 45° | Intermediate Gage | 33 |
| 94 | 130° | 50° | Intermediate Gage | 34 |
| 96 | 125° | 55° | Intermediate Gage | 35 |
| 98 | 120° | 60° | Intermediate Gage | 36 |
| 100 | 115° | 65° | Intermediate Gage | 37 |
| 102 | 110° | 70° | Intermediate Gage | 38 |
| 104 | 105° | 75° | Intermediate Gage | 39 |

Figure 42:
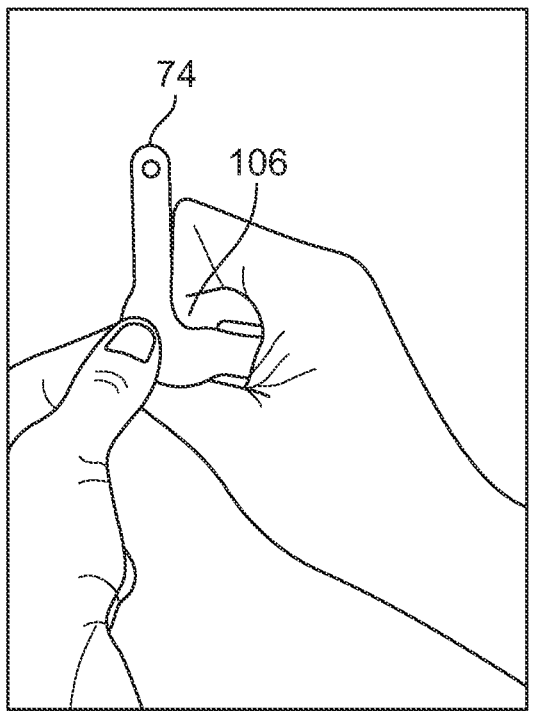
FIGS. 42 and 43 show an example static goniometer gage in use.
Figure 43:
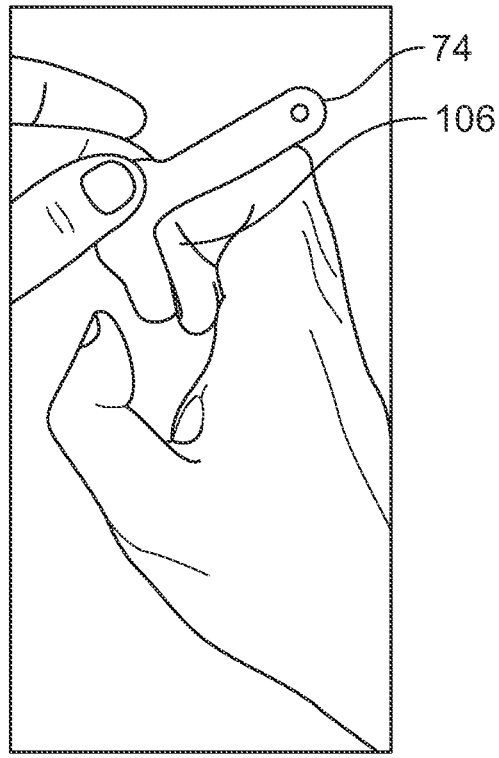

FIG. 42 shows an example gage 74 from gage set 27 in use to measure the angular flexion of a distal interphalangeal joint 106. Joint 106 is placed into flexion with the hand in the composite first configuration and gage 74 from the set 27 is applied to the joint to determine the angle through which the joint moves and thereby establish a measurement of the flexion range of motion at that instant. This angular measure may be recorded, and a subsequent measurement, for example, conducted after further occupational therapy, may use the same gage 74, showing little or no increase in range of motion, or a different gage subtending a different angle, which would indicate a change in the range of motion. FIG. 43 shows a gage 74 in use to measure flexion of the distal interphalangeal joint 106 with the hand in a hook configuration.

The gage sets 26 and 27 may thus be conveniently used by the patient, for example, in a home setting, to chart the progress of therapy and the change in the range of motion of a joint resulting from the therapy. It is expected that static gages (goniometer gages having no moving parts) and sets of static gages according to the invention will be easier to use than traditional goniometer gages having moving parts and will allow the convenient use of telehealth techniques for determining range of motion and changes therein as a measure of patient progress.

All of the embodiments of the claimed invention described herein are provided expressly by way of example only. Innumerable variations and modifications may be made to the example embodiments described herein without departing from the concept of this disclosure. Additionally, the scope of this disclosure is intended to encompass any and all modifications and combinations of all elements, features, and aspects described in the specification and claims, and shown in the drawings. Any and all such modifications and combinations are intended to be within the scope of this disclosure.

What is claimed is:

1. A static goniometer gage set for determining changes in range of motion of a joint in flexion and extension, said static goniometer gage set comprising:

an initial static goniometer gage, a final static goniometer gage, and a plurality of intermediate static goniometer gages, each said static goniometer gage of said initial static goniometer gage, said final static goniometer gage, and said plurality of intermediate static goniometer gages comprising:

a first elongate lobe comprising an inner surface;

a second elongate lobe comprising an inner surface and fixedly attached to said first elongate lobe at a vertex, wherein said inner surface of said first elongate lobe is shorter than said inner surface of said second elongate lobe; wherein said first and second elongate lobes of said initial static goniometer gage subtend an initial angle measured between said inner surface of said first lobe and said inner surface of said second lobe of said initial static goniometer gage;

said first and second elongate lobes of said final static goniometer gage subtend a final angle measured between said inner surface of said first lobe and said inner surface of said second lobe of said final static goniometer gage;

said first and second elongate lobes of each one of said intermediate static goniometer gages subtends a respective angle, measured between respective inner surfaces of said first and second lobes of each said intermediate static goniometer gage; wherein no two of said angles subtended by said inner surfaces of said first and second lobes of any of said static goniometer gages comprising said static goniometer gage set are equal to one another, and wherein said inner surfaces of said first and second lobes of each of said static goniometer gages are configured for engagement with a digit including said joint to compare said angle subtended by said inner surfaces of said first and second lobes of said static goniometer gage with said range of motion of said joint.

2. The static goniometer gage set according to claim 1, wherein said initial angle subtended by said first and second lobes of said initial static goniometer gage equals 180°.

3. The static goniometer gage set according to claim 2, wherein said final angle subtended by said first and second lobes of said final static goniometer gage equals 80°.

4. The static goniometer gage set according to claim 2, wherein said final angle subtended by said first and second lobes of said final static goniometer gage equals 100°.

5. The static goniometer gage set according to claim 3, further comprising a first through a nineteenth of said intermediate static goniometer gages, said respective angles subtended by said first and second lobes of each of said intermediate static goniometer gages increase in magnitude from said first through said nineteenth intermediate static goniometer gages by increments of 5°.

6. The static goniometer gage set according to claim 4, further comprising a first through a fifteenth of said intermediate static goniometer gages, said respective angles subtended by said first and second lobes of each of said intermediate static goniometer gages increase in magnitude from said first through said fifteenth intermediate static goniometer gages by increments of 5°.

7. The static goniometer gage set according to claim 3, further comprising a first through a nineteenth of said intermediate static goniometer gages, said respective angles subtended by said first and second lobes of each of said first through said nineteenth intermediate static goniometer gages have respective magnitudes of 175°, 170°, 165°, 160°, 155°, 150°, 145°, 140°, 135°, 130°, 125°, 120°, 115°, 110°, 105°, 100°, 95°, 90° and 85°.

8. The static goniometer gage set according to claim 4, further comprising a first through a fifteenth of said intermediate static goniometer gages, said respective angles subtended by said first and second lobes of each of said first through said fifteenth intermediate static goniometer gages have respective magnitudes of 175°, 170°, 165°, 160°, 155°, 150°, 145°, 140°, 135°, 130°, 125°, 120°, 115°, 110°, and 105°.

9. The static goniometer gage set according to claim 1, wherein said initial angle, said final angle, and said respective angles range from 180° to 80°.

10. The static goniometer gage set according to claim 1, wherein said initial angle, said final angle, and said respective angles range from 180° to 100°.

11. The static goniometer gage set according to claim 1, wherein each said static goniometer gage comprising said static goniometer gage set further comprises a third lobe extending from one of said first and second lobes, each said third lobe defining a respective surface.

12. The static goniometer gage set according to claim 11, wherein each said third lobe is positioned proximate to a respective one of said vertices.

13. The static goniometer gage set according to claim 11, further comprising indicia positioned on each said respective surface.

14. The static goniometer gage set according to claim 13, wherein said indicia describe a measure of a supplementary angle to said angle subtended by said first and second lobes.

15. The static goniometer gage set according to claim 11, wherein said first, second and third lobes are co-planar.

16. A method of using the static goniometer gage set according to claim 1, the method comprising:
    with said digit including said joint engaging said inner surfaces of the first and second lobes of any one gage of the initial static goniometer gage, the plurality of intermediate static goniometer gages, and the final static goniometer gage, comparing the angle subtended by the inner surfaces of the first and second lobes of said one gage with said range of motion of said joint.

* * * * *